United States Patent
Charrat et al.

(10) Patent No.: US 8,577,410 B2
(45) Date of Patent: Nov. 5, 2013

(54) RADIO COMMUNICATION DEVICE COMPRISING A UHF TAG READER

(75) Inventors: Bruno Charrat, Aix-en-Provence (FR); Nicolas Cordier, Luynes (FR)

(73) Assignee: Inside Secure, Aix-en-Provence Cedex (FR)

( * ) Notice: Subject to any disclaimer, the term of this patent is extended or adjusted under 35 U.S.C. 154(b) by 78 days.

(21) Appl. No.: 13/300,974

(22) Filed: Nov. 21, 2011

(65) Prior Publication Data

US 2012/0129571 A1     May 24, 2012

(30) Foreign Application Priority Data

Nov. 22, 2010   (FR) ..................................... 10 04528

(51) Int. Cl.
*H04M 1/00*      (2006.01)
(52) U.S. Cl.
USPC ................... 455/550.1; 455/422.1; 340/539.1
(58) Field of Classification Search
USPC ............ 455/422.1, 455, 456.1, 550.1, 556.2, 455/557.1, 558; 340/539.1, 539.11, 539.13
See application file for complete search history.

(56) References Cited

U.S. PATENT DOCUMENTS

| | | |
|---|---|---|
| 2002/0177407 A1 | 11/2002 | Mitsumoto |
| 2005/0130706 A1* | 6/2005 | Yamamoto .................... 455/558 |
| 2005/0186904 A1 | 8/2005 | Kowalski et al. |
| 2009/0213012 A1* | 8/2009 | Jiang et al. ............. 343/700 MS |

FOREIGN PATENT DOCUMENTS

| | | |
|---|---|---|
| EP | 1585233 A1 | 10/2005 |
| EP | 2034705 A1 | 3/2009 |
| EP | 2230774 A1 | 9/2010 |
| GB | 2358991 A | 8/2001 |
| WO | 2004034317 A2 | 4/2004 |
| WO | 2010015753 A2 | 2/2010 |

OTHER PUBLICATIONS

FR Search Report issued on Aug. 10, 2011 in FR Application No. 10004528.

* cited by examiner

*Primary Examiner* — Nhan Le
(74) *Attorney, Agent, or Firm* — Panitch Schwarze Belisario & Nadel LLP

(57) ABSTRACT

A device includes a radio transceiver equipped with a UHF antenna, a clock generator associated with the radio transceiver, a processor configured to periodically connect to the radiotelephony network by way of the radio transceiver, and a UHF tag reader configured to conduct a transaction with a UHF tag only outside periods of connection of the processor to the radiotelephony network. The device is particularly directed for use in mobile telephones.

15 Claims, 4 Drawing Sheets

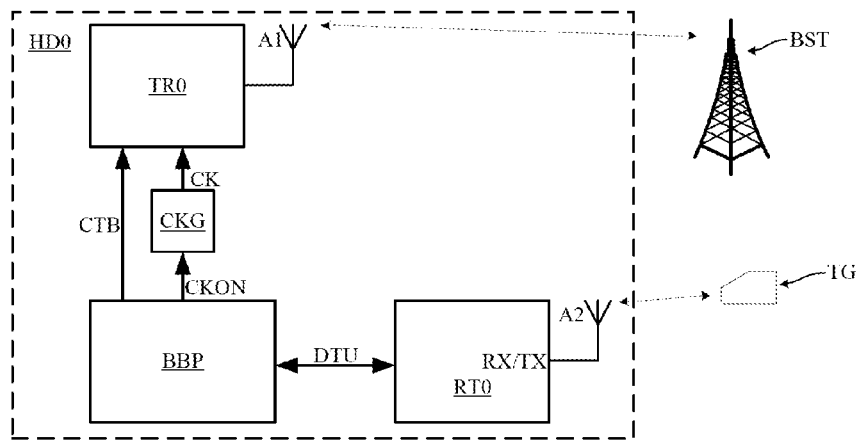
Fig. 1
"Prior Art"
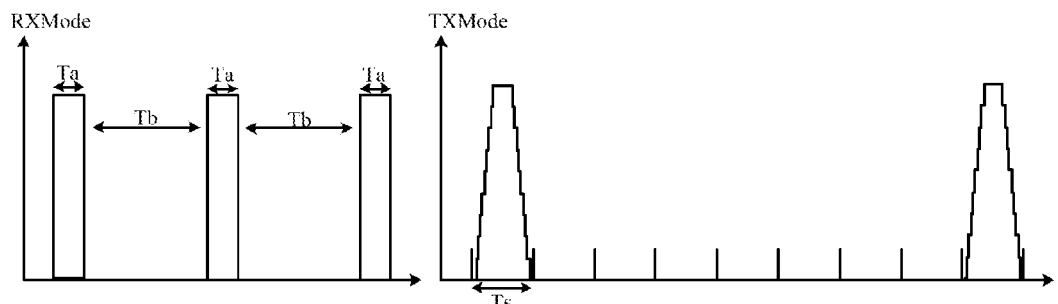
Fig. 2A     Fig. 2B
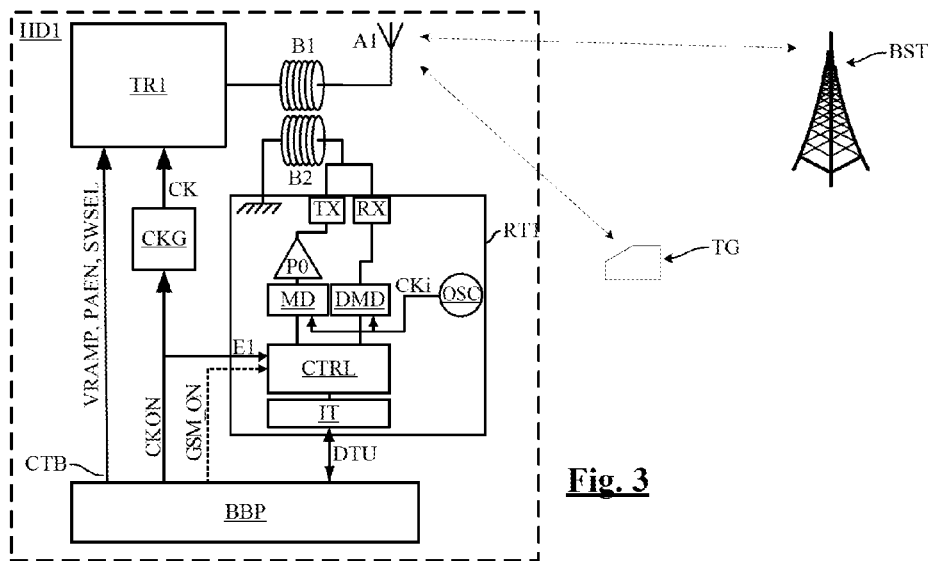
Fig. 3

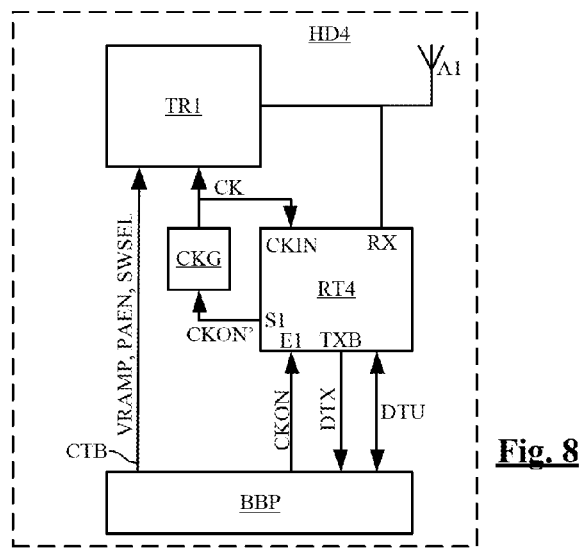
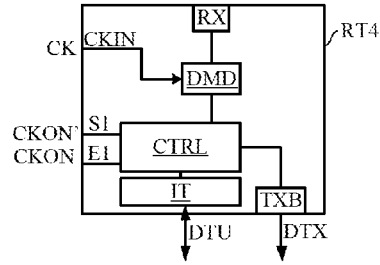
Fig. 9
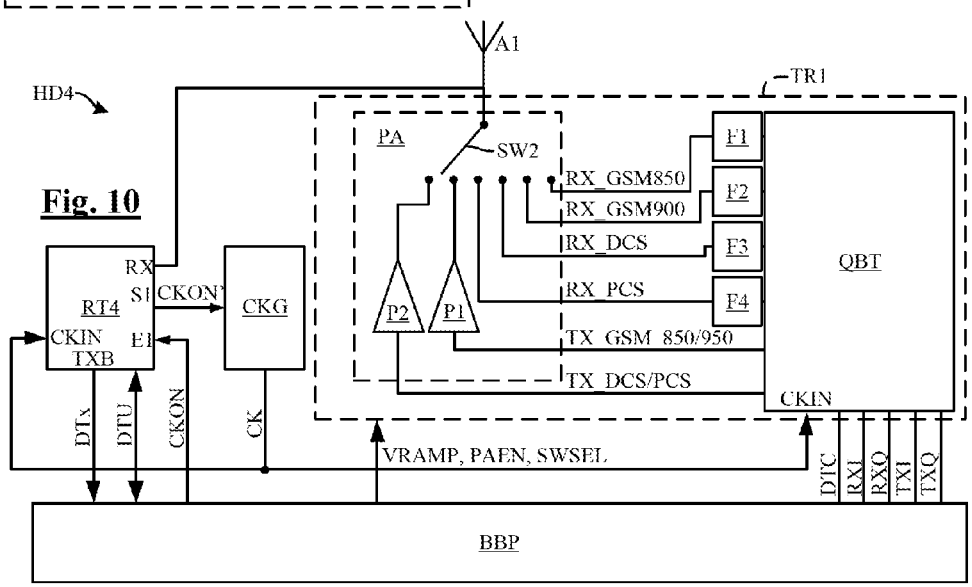
Fig. 10
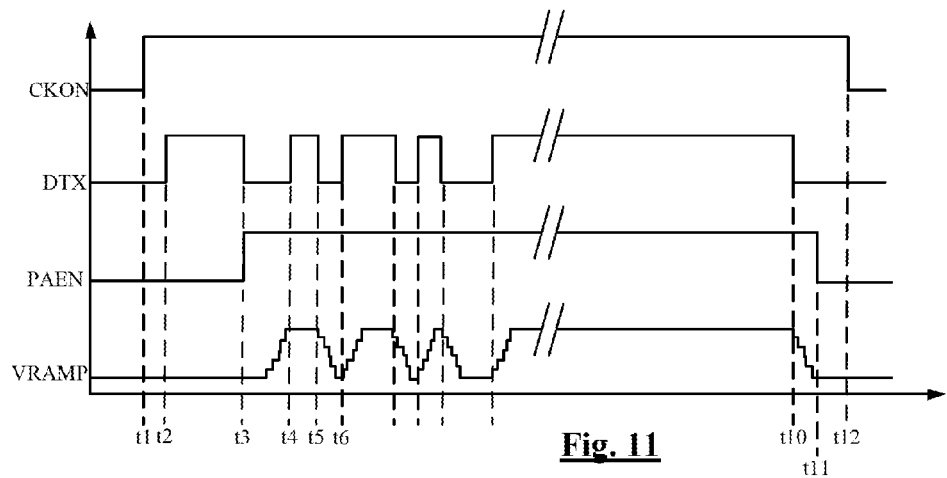
Fig. 11

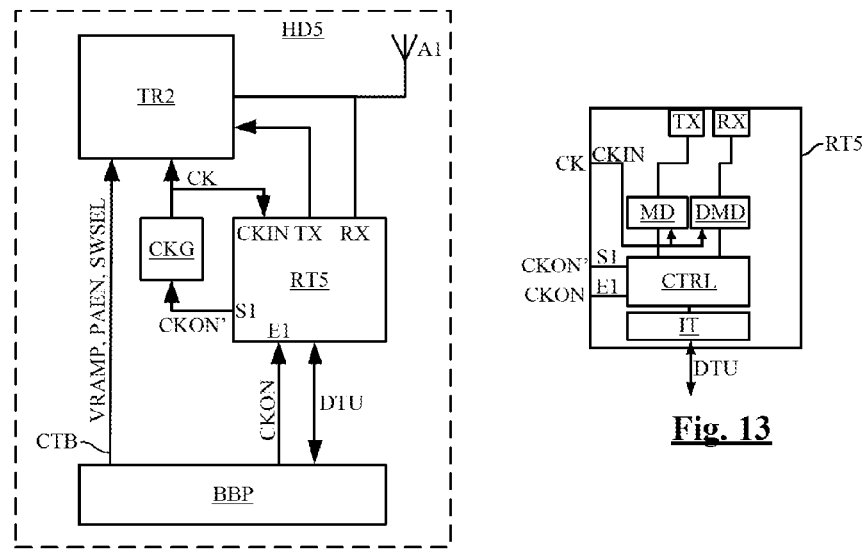
Fig. 12
Fig. 13
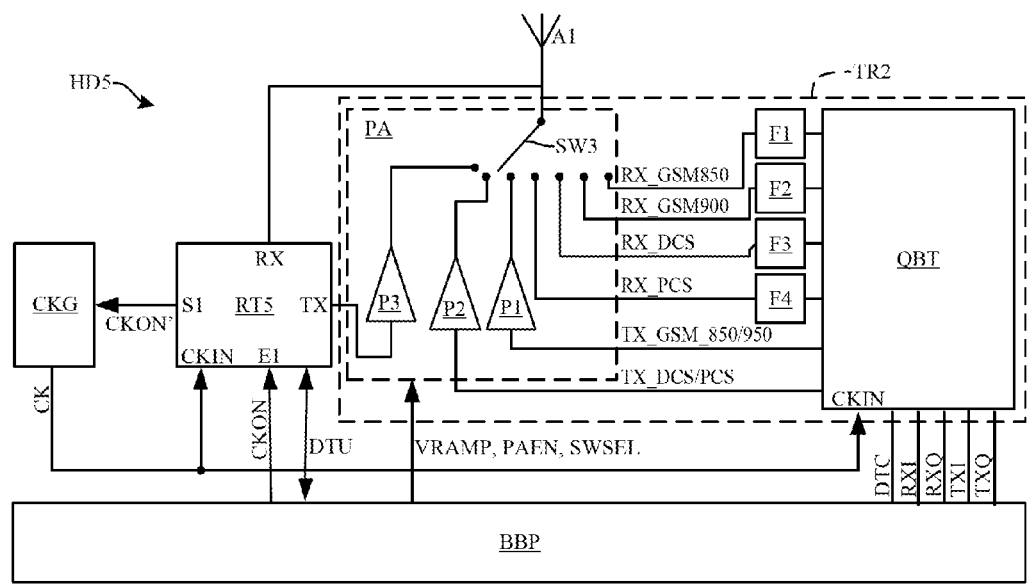
Fig. 14

RADIO COMMUNICATION DEVICE COMPRISING A UHF TAG READER

BACKGROUND OF THE INVENTION

Near field communication or NFC technology is today widespread and can be embedded in any type of portable device. NFC components are produced which can be configured in a "reader" operating mode to read RFID tags ("Radio Frequency Identification tags") or in a "card emulation" mode in which they emulate a contactless tag to exchange data with another reader.

Data is exchanged according to NFC technology by inductive coupling between an antenna coil of a reader and an antenna coil of the tag, through an alternating magnetic field transmitted by the reader, which generally oscillates at the standardized frequency of 13.56 kHz. Reader-type NFC components require large antenna coils, which represents a constraint for their integration into a mobile telephone.

Out of the various RFID tag technologies, there is a technique similar to the NFC technique, based on the principle of the electrical coupling of two UHF ("Ultra High Frequency") antennas instead of being based on the inductive coupling of two RF antenna coils. This technique is used to read or write data in RFID tags referred to as "UHF tags." UHF tags have a structure similar to that of NFC tags, but use a UHF antenna that is smaller than an NFC antenna coil. Like NFC tags, they generally transmit data passively using a backscattering technique involving modulating the reflection coefficient of the UHF tag antenna. Finally, like NFC tags, UHF tags can be purely passive and electrically powered by the electrical field emitted by the reader.

The cost price of UHF tags is lower than that of NFC tags. For the same features (mainly the memory size), their cost price is generally two to three times lower. This is mainly due to the fact that the surface area and the thickness of the antenna are reduced, thus decreasing the raw material requirements and enabling less expensive manufacturing processes to be used and increasing the rate of production lines.

There has been some desire for the two contactless communication techniques, NFC and UHF, to coexist. For example, the application International Patent Publication No. WO 2004/034317 or U.S. Patent Application Publication No. 2005/0186904 describes an NFC-UHF tag. The application International Patent Publication No. WO 2010/015753 describes an NFC/UHF converter enabling an NFC reader to be used to read UHF tags.

Regarding UHF tag readers, the emission of an electric field in the UHF band (860 MHz-960 MHz) also enables smaller antennas to be used which are thus easier to integrate into small devices such as mobile telephones. As an example, the company TagSense sells a small UHF reader under the name "NANO-UHF RFID READER," particularly designed to be integrated into a mobile telephone. This "nano-reader" operates both at the European UHF frequencies (865-868 MHz) and the North-American UHF frequencies (902-928 MHz). The nano-reader includes an oscillator, a controller, a modulator and a demodulator. The backscattering signal is demodulated up to the baseband through an I/Q mixing stage and is then filtered and amplified. The demodulated signal is then sampled and processed by the controller. The nano-reader is connected to a host processor through a three-wire bus.

FIG. 1 schematically shows a mobile telephone HD0 equipped with a UHF tag reader RT0. The telephone HD0 includes a baseband processor BBP, a clock generator CKG and a transceiver TR0. The transceiver TR0 is connected to a first antenna A1 and the reader RT0 is connected to a second antenna A2. The processor BBP is linked to the transceiver TR0 through a control bus CTB and to the reader RT0 through a data bus DTU. It controls the clock generator CKG by way of an on/off signal CKON.

The processor BBP thus uses firstly the transceiver TR0 to establish a connection to a base station BST of the GSM network, through the antenna A1, and secondly the UHF reader RT0 to read and/or write data in a UHF tag TG, through the antenna A2.

Although it is less complicated than integrating an NFC reader, integrating a UHF reader into a mobile telephone is quite expensive. It may therefore be desirable to rationalize this integration to further reduce the cost price of a UHF reader.

BRIEF SUMMARY OF THE INVENTION

Some embodiments of the present invention relate to a device including a radio transceiver equipped with a UHF antenna, a clock generator associated with the radio transceiver, a processor configured to periodically connect to a radiotelephony network via the radio transceiver, and a UHF tag reader, wherein the UHF tag reader is configured to conduct a transaction with a UHF tag only outside periods of connection of the processor to the radiotelephony network.

According to one embodiment, the UHF tag reader receives an activity signal from the processor indicating whether or not the radio transceiver is being used for a connection to the radiotelephony network.

According to one embodiment, the UHF tag reader includes at least one UHF signal receiving terminal coupled to the UHF antenna of the radio transceiver.

According to one embodiment, the UHF signal receiving terminal of the UHF tag reader is coupled inductively, electrically or capacitively to the UHF antenna.

According to one embodiment, the UHF signal receiving terminal of the UHF tag reader is linked to the UHF antenna through a switch.

According to one embodiment, the UHF signal receiving terminal of the UHF tag reader is directly connected to the UHF antenna.

According to one embodiment, the UHF tag reader includes a clock signal input receiving a clock signal supplied by the clock generator of the radio transceiver.

According to one embodiment, the activation of the clock generator of the radio transceiver is both controlled by the processor and controlled by the UHF tag reader.

According to one embodiment, the clock generator of the radio transceiver is activated by a first activation signal supplied by the processor and by a second activation signal supplied by the UHF tag reader.

According to one embodiment, the clock generator of the radio transceiver is activated by a second activation signal supplied by the UHF tag reader, the second activation signal being slaved to a first activation signal supplied by the processor.

According to one embodiment, the UHF tag reader comprises at least one UHF signal transmitting terminal coupled to the UHF antenna of the radio transceiver.

According to one embodiment, the UHF tag reader includes at least one output terminal linked to an input of the processor and supplying a data signal intended for a UHF tag, and the processor is configured to transmit the data signal through the radio transceiver on behalf of the UHF tag reader, in the form of a modulated UHF radio signal.

According to one embodiment, the UHF tag reader and the processor are configured to exchange synchronization signals prior to transmitting the data signal, through the output terminal linked to the input of the processor.

According to one embodiment, the UHF tag reader comprises at least one output terminal linked to an input of the radio transceiver and supplying the radio transceiver with a modulated signal to be transmitted to a UHF tag.

According to one embodiment, the input of the radio transceiver linked to the output of the UHF tag reader is linked to the antenna through a switch controlled by the processor.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 1 described above shows a mobile telephone equipped with a UHF tag reader,

FIG. 2A, 2B show radio activity cycles of a mobile telephone,

FIG. 3 shows a first embodiment of a mobile telephone according to the present invention, FIG. 8 shows a fourth embodiment of a mobile telephone according to the present invention, FIG. 9 shows the architecture of a UHF tag reader present in the telephone in FIG. 8, FIG. 10 shows the architecture of a radio transceiver present in the telephone in FIG. 8, FIG. 11 shows timing diagrams of signals illustrating the operation of the telephone in FIG. 8, FIG. 12 shows a fifth embodiment of a mobile telephone according to the present invention, FIG. 13 shows the architecture of a UHF tag reader present in the telephone in FIG. 12, and FIG. 14 shows an example of architecture of a radio transceiver present in the telephone in FIG. 12.

DETAILED DESCRIPTION OF THE INVENTION

Figure 4:
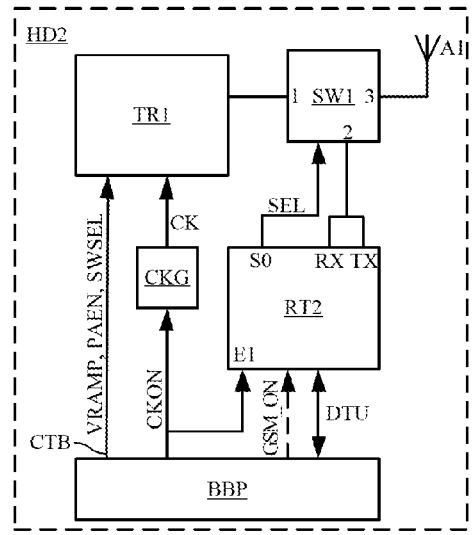
FIG. 4 shows a second embodiment of a mobile telephone according to the present invention.

It is well-known that a GSM telephone has periods of activity during which it transmits "bursts" of radioelectric signals, interrupted by periods of inactivity during which its radio-communication circuitry is not used. Furthermore, a telephone is in a "GSM standby" mode most of the time so as to save its battery. Radio exchanges are then brief and spaced out in time.

Some embodiments of the present invention are based on the observation that the periods of time during which the telephone has no GSM activity are sufficient to conduct a transaction with a UHF tag. A "transaction" means any activity relating to the reading or writing of a UHF tag, including simply transmitting an interrogation signal to determine whether or not a UHF tag is within the interrogation range of the reader.

To illustrate this, FIG. 2A shows the activity of a telephone in GSM standby mode. Listening periods in receive mode (RX mode), of a time Ta, enabling the telephone to receive supervision packets, interrupted by periods of a time Tb during which the radiotelephony circuits are idle can be distinguished. The time Ta is generally short, for example 577 microseconds. The time Tb varies depending on the operator and is generally between 0.471 and 2.122 seconds. This is sufficient to perform a transaction with a UHF tag (i.e., sending an interrogation signal, possibly followed by reading and/or writing the tag).

FIG. 2B illustrates the activity of the telephone when transmitting (Mode TX) during a telephone call. The telephone is given a time slot in a Time Division Multiple Access (TDMA) frame comprising 8 or 16 slots. The usual length Ts of a time slot is 577 microseconds, during which the telephone transmits a burst of radioelectric signals. With a frame of 8 time slots, 7*577 microseconds thus elapse, i.e., approximately 4 milliseconds, before the telephone transmits a radio signal again, which is also sufficient to perform a simple transaction with a UHF tag, i.e., a read-type transaction without writing any data in the tag. As an example, the length of an "identifier read"-type transaction is typically in the order of one millisecond with a UHF tag.

Thus, some embodiments of the present invention relate to a mobile telephone including a UHF tag reader that is configured to conduct a transaction with a UHF tag when the radio-communication circuitry of the telephone is idle. This feature enables radiotelephony resources of the telephone to be made available to the UHF tag reader, for example to simplify the architecture of the reader and reduce its cost price. Such "provision" of radiotelephony resources may include all or part of the following configurations:

using the antenna of the radio transceiver of the telephone outside the periods of GSM activity, using a radio clock generator of the telephone outside the periods of GSM activity, and using the radio transmitter of the telephone outside the periods of GSM activity.

Embodiments of a mobile telephone equipped with a UHF reader using at least one element of the radio-communication equipment of the telephone to conduct a transaction with a UHF tag outside the periods of GSM activity, will be described below.

FIG. 3 shows a mobile telephone HD1 equipped with a UHF tag reader RT1. The telephone HD1 includes a baseband processor BBP and radio-communication circuitry including a clock generator CKG and a transceiver TR1 connected to an antenna A1. The transceiver TR1 is, for example, a quad-band GSM transceiver (850, 900, 1,800 or 1,900 MHz). The clock generator CKG is, for example, of VTCXO (Voltage Controlled Temperature-Compensated Crystal Oscillator) type and supplies the transceiver TR1 with a clock signal CK of 26 MHz. The telephone HD1 includes other units that are not represented for the sake of simplicity, such as a display device and a keyboard, an electric battery, a microphone, a speaker, or the like.

The processor BBP is linked to the transceiver TR1 through a control bus CTB which particularly conveys control signals PAEN, VRAMP, SWSEL described below. The processor BBP also controls the clock generator CKG by way of an on/off signal CKON. Thus, the processor BBP uses the clock generator CKG and the transceiver TR1 to establish a connection with a base station BST of the GSM network.

The reader RT1 has a classic architecture and includes, for example, a controller CTRL, such as a microcontroller, a high frequency oscillator OSC, a modulator MD, a demodulator DMD and a communication interface IT linked to the processor BBP through a data bus DTU. The oscillator OSC supplies the modulator MD and the demodulator DMD with an internal clock signal CKi. A low-cost auxiliary oscillator, such as a ring oscillator, not represented in FIG. 3, can also be provided to supply the controller CTRL with a clock signal. The modulator MD has an input linked to the controller CTRL and an output linked to an output terminal TX of the reader through a radio frequency amplifier P0. The demodulator DMD has an input linked to an input terminal RX of the reader and an output linked to the controller CTRL.

The output TX and input RX terminals are coupled to the antenna A1 of the transceiver TR1. The coupling is done here by way of a first coil B1 in series with the antenna A1, inductively coupled to a second coil B2 linked to the input terminal RX and to the output terminal TX of the reader RT1. In one alternative, this inductive coupling is replaced with an electrical coupling by way of micro-strips, or with a capacitive coupling. The reader RT1 may therefore use the antenna A1 of the telephone to interact with a UHF tag TG, and it is not necessary to provide a second antenna in the telephone. Preferably, the circuitry connected to the terminals RX and TX of the reader RT1, particularly the output of the amplifier P0 and the input of the demodulator DMD, is designed such that it has a high impedance when the telephone has a GSM activity, so as not to disturb the operation of the transceiver TR1.

In practice, UHF applications (UHF tag reading and/or writing) can be implemented in two ways:

1) the processor BBP manages the UHF applications and thus executes itself the programs designed to implement these applications ("application programs"). The reader RT1 is only used as a UHF coupler, i.e., to transmit commands supplied by the processor BBP to UHF tags and to receive data supplied by the tags, which is then supplied to the processor BBP for processing;

2) the processor BBP does not manage the UHF applications which are handled by the reader RT1. The controller CTRL must, in this case, have sufficient processing power and program memory to host and execute application programs.

In the first case, the processor BBP only activates the reader RT1 outside the periods of GSM activity, to avoid conflicts of electric signals on the antenna A1.

In the second case, shown in FIG. 3, the reader RT1 includes an input E1 (for example a port of the controller CTRL) receiving a signal enabling it to know whether or not the radio-communication circuit of the telephone (transceiver TR1 and clock generator CKG) is active or idle. This signal can be a "GSM_ON" signal transmitted by the processor BBP, as represented in dotted lines, or the on/off signal CKON that the processor BBP applies to the clock generator CKG. The reader RT1 is configured to monitor the signal CKON and not to execute a UHF application when the signal CKON is in a state indicating that the processor BBP is using the clock generator CKG.

FIG. 4 shows a mobile telephone HD2 according to an embodiment of the present invention equipped with a UHF tag reader RT2. The reader RT2 differs from the reader RT1 in that it includes an output S0 supplying a signal SEL. The telephone HD2 differs from the telephone HD1 in that the coupling coils B1, B2 are replaced with a multiplexer switch SW1 driven by the signal SEL. The switch SW1 includes an input 1 linked to the antenna terminal of the transceiver TR1, an input 2 linked to the terminals RX, TX of the reader RT2, and an output linked to the antenna A1. Depending on the value of the signal SEL, the input 1 is linked to the output 3 or the input 2 is linked to the output 3. In the first case, the transceiver TR1 is linked to the antenna A1. In the second case, the terminals TX and RX of the reader RT2 are linked to the antenna A1.

It is assumed in the example of an embodiment represented in FIG. 4 that the UHF applications are managed by the reader RT2. As above, the latter receives at an input E1, the signal CKON (or GSM_ON) enabling it to know whether or not the antenna A1 is used by the processor BBP, so as to give the signal SEL the appropriate value.

In one alternative in which the UHF applications are managed by the processor BBP, the signal SEL is supplied by the processor BBP, which then itself controls the switch SW1.

Figure 5:
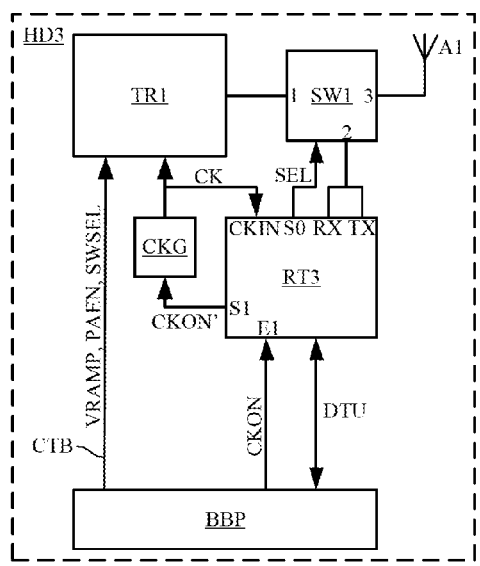
FIG. 5 shows a third embodiment of a mobile telephone according to the present invention.
Figure 7:
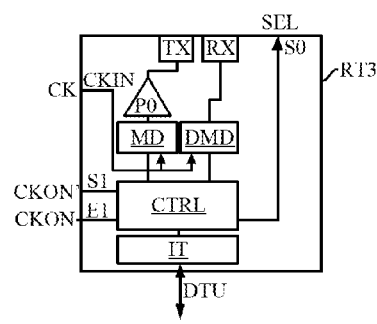
FIG. 7 shows the architecture of a UHF tag reader present in the telephone in FIG. 5 or 6.

FIG. 5 shows a mobile telephone HD3 according to an embodiment of the present invention, equipped with a reader RT3. The structure of the reader RT3 is represented in greater detail in FIG. 7. The reader RT3 differs from the reader RT1 (Cf. FIG. 3) in that it includes:

the input E1 receiving the signal CKON and the output S0 supplying the signal SEL, described above in relation with the reader RT2, an output S1 supplying a signal CKON', formed, for example, by a port of the controller CTRL, and an input CKIN receiving the clock signal CK supplied by the clock generator CKG.

The signal CK received at the input CKIN is applied to the modulator MD and to the demodulator DMD and replaces the clock signal CKi supplied by the internal oscillator OSC in the reader RT1 (Cf. FIG. 3). The oscillator OSC is removed to simplify the architecture and reduce the cost price of the reader RT3.

The clock generator CKG is here controlled by the signal CKON' and the signal CKON is applied to the input E1 of the reader RT3. The controller CTRL manages the signal CKON' in a transparent manner as regards the activation of the clock generator CKG by the processor BBP. Thus, when the signal CKON has a value corresponding to the start-up of the clock generator CKG (active value), the signal CKON' is identical to the signal CKON. On the other hand, when the signal CKON has a value corresponding to the switch-off of the clock generator CKG (inactive value), the controller CTRL may at any time decide to start the clock generator CKG to conduct a transaction with a UHF tag. It is possible for the processor BBP to put the signal CKON to the active value while the reader RT3 is conducting or initiating a transaction. In this case, priority is given to the GSM activity and the reader RT3 interrupts the UHF transaction while leaving the clock generator in the activated state.

Thus, the radiotelephony resources of the telephone made available here to the reader RT3 are the antenna A1, via the switch SW1, and the clock generator CKG.

In one alternative in which the UHF applications are managed by the processor BBP, the signal SEL can be directly supplied by the processor BBP, which then controls the switch SW1 itself. Similarly, the signal CKON' is not necessary and the clock generator CKG can be directly controlled by the processor BBP.

Figure 6:
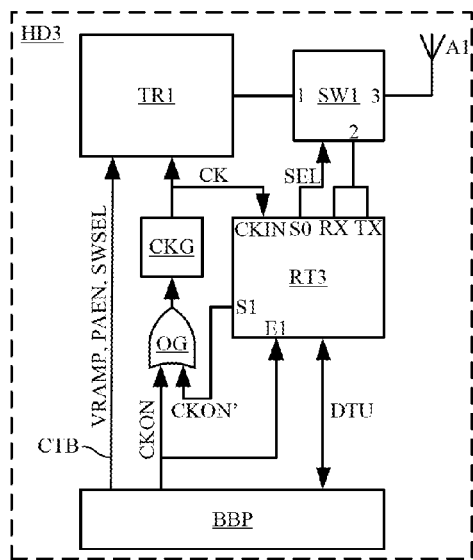
FIG. 6 shows an alternative of the mobile telephone in FIG. 5.

FIG. 6 shows a diagram of the telephone HD3 which is equivalent to the one in FIG. 5 as regards the control of the clock generator CKG. The signals CKON and CKON' are combined in an OR-type gate OG the output of which is applied to the control input of the clock generator CKG. The clock generator CKG is activated when the signal CKON or the signal CKON' has the active value. In this case, it is not necessary for the signal CKON' to copy the signal CKON when the latter has the active value.

FIG. 8 shows a mobile telephone HD4 equipped with a reader RT4. The structure of the reader RT4 is represented in greater detail in FIG. 9. The reader RT4 differs from the reader RT3 in that the output terminal TX is removed, as well as the modulator MD and the high frequency amplifier P0. The output terminal TX is replaced with a baseband output TXB, here a port of the controller CTRL, that supplies the processor BBP with a data carrier signal DTX. The reader RT4 also differs from the reader RT3 in that the input terminal RX is directly connected to the antenna A1, as is the antenna terminal of the transceiver TR1. The input terminal RX preferably has a high impedance so as not to mismatch the antenna A1 and not to decrease the performance of the transceiver TR1.

Thus, the radiotelephony circuitry of the telephone HD4 made available here to the reader RT4 include:

the antenna A1 and the clock generator CKG to receive data sent by a UHF tag, read via the terminal RX, the processor BBP, the clock generator CKG, the transceiver TR1 and the antenna A1 to emit an electric field and modulate this electric field according to the data signal DTX.

FIG. 10 shows an example of the structure of the transceiver TR1. The latter includes a Quad Band Transceiver ("QBT") block and a power amplifier PA. The power amplifier PA includes a multiplexer switch SW2 and two amplifiers P1, P2. The switch SW2 has an external terminal connected to the antenna A1 and six internal terminals, and connects one of the internal terminals to the external terminal according to the value of the signal SWSEL supplied by the processor BBP.

A first internal terminal of the switch SW2, linked to an input of the QBT transceiver through a filter F1, is provided for receiving a signal RX_GSM850 (modulated GSM signal of 850 MHz received from a base station). A second internal terminal, linked to an input of the QBT transceiver through a filter F2, is provided for receiving a signal RX_GSM900 (modulated GSM signal of 900 MHz received from a base station). A third internal terminal, linked to an input of the QBT transceiver through a filter F3, is provided for receiving a signal RX_DCS (modulated DCS signal of 1,800 MHz received from a base station). A fourth internal terminal, linked to an input of the QBT transceiver through a filter F4, is provided for receiving a signal RX_PCS (modulated PCS signal of 1,900 MHz received from a base station). A fifth internal terminal is linked to the output of the amplifier P1. The input of this amplifier receives a signal TX_GSM_850/950 supplied by the QBT transceiver (modulated GSM signal of 850 MHz or 900 MHz to be sent to a base station). Lastly, a sixth internal terminal is linked to the output of the amplifier P2. The input of this amplifier receives a signal TX_DCS/PCS supplied by the QBT transceiver (modulated DCS signal of 1,800 MHz or PCS signal of 1,900 MHz to be sent to a base station).

In addition to the signal SWSEL, the processor BBP applies the signals PAEN and VRAMP mentioned above to the power amplifier PA. The signal PAEN is an activation signal for activating the power amplifier PA and a selection signal for selecting one of the amplifiers P1, P2. The signal VRAMP is an analog "burst shaping"-type signal for shaping bursts of electric signals transmitted by the amplifier P1 or P2.

Furthermore, the processor BBP applies to the QBT transceiver block differential signals TXI and TXQ conveying the I/Q GSM data at the base frequency and which must be sent to a base station. In receive mode, the QBT transceiver transmits to the processor BBP differential signals RXI, RXQ conveying I/Q GSM data. Lastly, the QBT transceiver receives the clock signal CK supplied by the clock generator CKG.

The operation of the telephone HD4 when transmitting data to a UHF tag is illustrated in FIG. 11 by timing diagrams representing the signals VRAMP, PAEN, DTX, CKON. The possibility of modulating the transmitting power of the amplifiers P1 or P2 by way of the signal VRAMP to transmit the signal DTX in the form of a radioelectric signal is used here. More particularly, the amplifier P1 is used because it has a bandwidth compatible with the UHF transaction frequencies, while the amplifier P2 is provided for DCS high bands of 1,800 MHz and PCS high bands of 1,900 MHz. Furthermore, in this embodiment, the signal DTX is also used as a handshake signal by way of an open drain line controlling system, so as to enable the reader RT4 to exchange synchronization signals with the processor BBP.

At an instant t1, the telephone leaves the GSM standby mode and starts the oscillator CKG by putting the signal CKON to 1. The transceiver TR1 is put to listening mode while leaving the signal PAEN on 0, so as to receive a supervision packet sent by a base station GSM. As the GSM radio is activated, the reader RT4 knows that it can perform a UHF transaction as soon as the GSM packet is fully received. It notifies the processor BBP via the signal DTX which it releases at level 1 at an instant t2. The processor BBP notifies the reader RT4 of the end of the GSM activity by pulling the signal DTX to 0 at an instant t3. Simultaneously, the processor BBP launches the power amplifier PA by putting the signal PAEN to 1. The processor BBP then gradually increases the value of the signal VRAMP applied to the power amplifier. At an instant t4, the processor BBP notifies the reader RT4 that the radio is on by releasing the signal DTX, which changes back to 1. From an instant t6, the reader RT4 sends the data DTX to the processor BBP and the latter performs an amplitude modulation of the electric signal applied to the antenna A1 using the signal VRAMP. After transmitting data DTX, the transaction comprises a stage of receiving data via the terminal RX of the reader RT4, without going through the transceiver TR1. During this receive stage, the signal DTX remains on 1 so that the transceiver TR1 continues to emit the electric field.

At an instant t10, the UHF transaction is completed and the reader RT4 notifies the processor BBP by pulling the signal DTX to 0. At an instant t11, the processor BBP deactivates the power amplifier PA by putting the signal PAEN to 0. At an instant t12, it stops the clock generator CKG by putting the signal CKON to 0, which also causes the signal CKON' supplied by the reader RT4 to change to 0.

FIG. 12 shows a mobile telephone HD5 equipped with a reader RT5. The structure of the reader RT5 is represented in greater detail in FIG. 13. The reader RT5 includes the modulator MD and the demodulator DMD, which here receive the clock signal CK supplied by the clock generator CKG. As described above, the demodulator DMD is connected to the terminal RX of the reader, which is directly connected to the antenna A1. The modulator MD is connected to the terminal TX of the reader without going through the amplifier P0, which is removed. Thus, the terminal TX supplies a modulated signal which is not amplified.

Additionally, the telephone HD5 comprises a transceiver TR2 the structure of which is represented in FIG. 14. The transceiver TR2 differs from the transceiver TR1 in that it includes an additional power amplifier P3 the input of which is connected to the non-amplified output TX of the reader RT5. The transceiver TR2 also comprises a switch SW3 having 7 internal terminals instead of 6, the seventh terminal being connected to the output of the amplifier P3. The switch SW3 links the output of the amplifier P3 to the antenna A1 when the processor BBP supplies an appropriate control signal SWSEL, on request from the reader RT5.

In one alternative embodiment, the transceiver TR2 does not comprise the amplifier P3 but includes a multiplexer circuit arranged at the input of the amplifier P1, which enables the output TX of the reader RT5 to be connected to the input of the amplifier P1.

Thus, the radiotelephony circuitry of the telephone HD5 made available here to the reader RT5 comprise:

the antenna A1 and the clock generator CKG to receive data sent by a UHF tag, the clock generator CKG, the transceiver TR1 and the antenna A1 to transmit data to a UHF tag.

It will be understood by those skilled in the art that various other embodiments and applications of a mobile telephone according to the present invention are possible, particularly by combining the various alternative embodiments described above.

In particular, it will be understood that the feature according to which the UHF tag reader is configured to conduct a transaction with a UHF tag only outside periods of connection of the processor to the GSM network, and receives to this end, from the processor, an activity signal indicating whether the GSM transceiver is being used for a connection to the GSM network or not, and is susceptible to various applications other than those described above, including using at least one of the elements of the GSM transceiver in the operation of the UHF tag reader. This feature may in particular be implemented when the tag reader doesn't use any of the GSM transceiver elements, in order to prevent a possible interference between signals emitted by the reader and those emitted by the GSM transceiver when these two devices are functioning at the same time.

Furthermore, although only the aspects of a UHF reader relating to the reading or writing of UHF tags have been described above, it goes without saying that such a reader may also include circuitry for implementing the tag emulation (also referred to as card emulation) mode. As this operating mode does not require the emission of the electric field, such emulation circuitry is linked to the terminal RX of the reader, in parallel with the demodulator DMD.

Embodiments of the present invention may, furthermore, be applied to any type of device equipped with radiotelephony circuitry to carry voice or data, for example a 3G modem card designed to be inserted into a computer.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A device comprising:
    a radio transceiver equipped with a UHF antenna;
    a clock generator associated with the radio transceiver;
    a processor configured to regularly alternate radio connection periods, wherein the processor connects to a radiotelephony network (BST) by way of the radio transceiver, with radio idle periods, wherein the radio transceiver is not being used by the processor to connect to the radiotelephony network; and
    a UHF tag reader,
    wherein the UHF tag reader is configured to conduct a transaction with a UHF tag (TG) only during a radio idle period.

2. The device according to claim 1, wherein the UHF tag reader receives an activity signal from the processor indicating whether or not the radio transceiver is being used for a connection to the radio-communications network.

3. The device according to claim 1, wherein the UHF tag reader comprises at least one UHF signal receiving terminal coupled to the UHF antenna of the radio transceiver.

4. The device according to claim 3, wherein the UHF signal receiving terminal of the UHF tag reader is coupled inductively, electrically or capacitively to the UHF antenna.

5. The device according to claim 3, wherein the UHF signal receiving terminal of the UHF tag reader is linked to the UHF antenna through a switch.

6. The device according to claim 3, wherein the UHF signal receiving terminal of the UHF tag reader is directly connected to the UHF antenna.

7. The device according to claim 1, wherein the UHF tag reader comprises a clock signal input receiving a clock signal supplied by the clock generator of the radio transceiver.

8. The device according to claim 7, wherein the activation of the clock generator of the radio transceiver is both controlled by the processor and controlled by the UHF tag reader.

9. The device according to claim 8, wherein the clock generator of the radio transceiver is activated by a first activation signal supplied by the processor and by a second activation signal supplied by the UHF tag reader.

10. The device according to claim 8, further comprising a first activation signal supplied by the processor, wherein the clock generator of the radio transceiver is activated by a second activation signal supplied by the UHF tag reader, the second activation signal being slaved to the first activation signal.

11. The device according to claim 1, wherein the UHF tag reader comprises at least one UHF signal transmitting terminal coupled to the UHF antenna of the radio transceiver.

12. A device according to claim 1, wherein:
    the UHF tag reader comprises at least one output terminal linked to an input of the processor and supplying a data signal intended for a UHF tag, and
    the processor is configured to transmit the data signal through the radio transceiver on behalf of the UHF tag reader, in the form of a modulated UHF radio signal.

13. The device according to claim 12, wherein the UHF tag reader and the processor are configured to exchange synchronization signals prior to transmitting the data signal, through the output terminal linked to the input of the processor.

14. The device according to claim 1, wherein the UHF tag reader comprises at least one output terminal linked to an input of the radio transceiver and supplying the radio transceiver with a modulated signal to be transmitted to a UHF tag.

15. The device according to claim 14, wherein the input of the radio transceiver linked to the output of the UHF tag reader is linked to the antenna through a switch controlled by the processor.

* * * * *